(12) United States Patent
Kurauchi et al.

(10) Patent No.: US 11,983,246 B2
(45) Date of Patent: May 14, 2024

(54) DATA ANALYSIS SYSTEM, LEARNING DEVICE, METHOD, AND PROGRAM

(71) Applicant: NIPPON TELEGRAPH AND TELEPHONE CORPORATION, Tokyo (JP)

(72) Inventors: Yuki Kurauchi, Tokyo (JP); Naoto Abe, Tokyo (JP); Hiroshi Konishi, Tokyo (JP); Hitoshi Seshimo, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 552 days.

(21) Appl. No.: 17/291,265

(22) PCT Filed: Nov. 1, 2019

(86) PCT No.: PCT/JP2019/043006
§ 371 (c)(1),
(2) Date: May 4, 2021

(87) PCT Pub. No.: WO2020/095834
PCT Pub. Date: May 14, 2020

(65) Prior Publication Data
US 2022/0004817 A1 Jan. 6, 2022

(30) Foreign Application Priority Data
Nov. 7, 2018 (JP) .................................. 2018-209641

(51) Int. Cl.
*G06N 3/04* (2023.01)
*G06F 18/21* (2023.01)
*G06N 3/08* (2023.01)

(52) U.S. Cl.
CPC ............. *G06F 18/217* (2023.01); *G06N 3/04* (2013.01); *G06N 3/08* (2013.01)

(58) Field of Classification Search
CPC .......... G06F 18/217; G06N 3/04; G06N 3/08; G06N 3/045; G06V 10/454; G06V 10/82
(Continued)

(56) References Cited

U.S. PATENT DOCUMENTS 10,599,975 B2 * 3/2020 Petroski Such ........ G06N 3/084
11,562,764 B2 * 1/2023 Schmidt .................. G10L 19/02
2019/0034781 A1 * 1/2019 Asano ...................... G06N 5/04

OTHER PUBLICATIONS

Nippon Telegraph and Telephone West Corporation (2018) "Promote integrated next-generation agricultural projects through IT fusion" Oct. 13, 2018(Reading Day) Online [Website] https://www.ntt-west.co.jp/csr/2015/valuable/customer/topics02.html.
(Continued)

*Primary Examiner* — Juan A Torres

(57) ABSTRACT

The present invention provides a data analysis system capable of performing analysis appropriately using a CNN model while reducing communication traffic. A data analysis system 90 includes: an instrument 10 that performs a conversion process of outputting compression data obtained as a result of processing observation data received via an input layer of a learned neural network 18A using portions ranging from the input layer to a predetermined intermediate layer; and a device 20 that performs an analysis process of inputting the compression data to a subsequent intermediate layer in a learned neural network 18B, inputting data obtained by decoding the compression data, which is an output of the subsequent intermediate layer, to an output layer configured using a CNN model, and obtaining an analysis result of the observation data as an output of the output layer. The learned neural networks 18A and 18B are learned in advance so as to minimize an error between the output of the output layer
(Continued)

when observation data of which the true analysis result obtained by analysis is known is input and the true analysis result and an error between the observation data and the decoded data.

14 Claims, 10 Drawing Sheets

(58) Field of Classification Search
USPC .......................................................... 382/157
See application file for complete search history.

(56) References Cited

OTHER PUBLICATIONS

Kurauchi et al. (2018) "Neural Feature Extraction for Traffic-Efficient Sensor Fusion" Multimedia, Distributed, Cooperative and Mobile (DICOMO2018) Symposium Proceedings, Jul. 2018, pp. 1500-1506.

* cited by examiner

DATA ANALYSIS SYSTEM, LEARNING DEVICE, METHOD, AND PROGRAM

CROSS-REFEENCE TO RELATED APPLICATIONS

This application is a U.S. 371 Application of International Patent Application No. PCT/JP2019/043006, filed on 1 Nov. 2019, which application claims priority to and the benefit of JP Application No. 2018-209641, filed on 7 Nov. 2018, the disclosures of which are hereby incorporated herein by reference in their entireties.

TECHNICAL FIELD

The present invention relates to a data analysis system, a learning apparatus, a method, and a program, and particularly, relates to a data analysis system, a method, and a program for analyzing observation data observed by an instrument such as a sensor.

BACKGROUND ART

It is expected that the number of IoT (Internet of Things) devices will increase in the future. With the increase in the number of IoT devices, it is important to save power consumed by IoT devices.

In many cases, the purpose of installing IoT devices is not the detailed data obtained by the IoT devices but the analysis result obtained from the detailed data (for example, see NPL 1). Machine learning such as a neural network is used for performing analysis appropriately.

CITATION LIST

Non Patent Literature

[NPL 1] NTT WEST, "IT Yûgô niyoru Tôgôgata Zisedai Nôgyô Purozyekuto wo Suisin|Okyakusama ni Taisuru Katisôzô|Zigyō wo Tûzita Katisôzô (Promote integrated next-generation agricultural projects through IT fusion, Value creation for customers, Value creation through business)"<retrieved: Oct. 13, 2018, Internet: https://www.ntt-west.co.jp/csr/2015/valuable/customer/topics02.html>

SUMMARY OF THE INVENTION

Technical Problem

A system including an instrument such as a sensor and a device such as a server computer is known as a data analysis system which uses machine learning such as a neural network. When observation data is transmitted from an instrument to a device, as illustrated in FIG. 10, a method of transmitting intermediate data obtained by performing inference calculation based on machine learning halfway from the instrument to the device may be used. In this case, the device continuously performs the inference calculation based on the machine learning from the received intermediate data and obtains an analysis result. In this way, communication-saving sensing can be realized. In this case, since information is narrowed down to information necessary for inference and is compressed by performing learning so that inference is performed without decoding after transmission, high-accuracy inference can be realized at a high compression rate.

However, when a CNN (Convolutional Neural Network) model which is a general locally connected model is applied, if compression is performed at a high compression rate on the instrument side, since the correlation with the neighborhood is lost during compression, this can be applied to a fully connected model only, and cannot be applied to a CNN model.

The present invention has been made to solve the above-described problems, and an object thereof is to provide a data analysis system, a learning apparatus, a method, and a program capable of performing analysis appropriately using a CNN model while reducing communication traffic.

Means for Solving the Problem

In order to attain the object, a data analysis system according to the present invention is a data analysis system including a device that analyzes observation data observed by an instrument, wherein the instrument includes a conversion unit that performs a conversion process of converting the observation data to compression data obtained by compressing the observation data, the conversion process involves outputting the compression data which is an output of a predetermined intermediate layer obtained as a result of processing the observation data received via an input layer of a learned neural network prepared in advance using portions ranging from the input layer to the intermediate layer, the device includes an analysis unit that performs an analysis process of obtaining an analysis result of the observation data from the compression data, the analysis process involves inputting the compression data to an intermediate layer subsequent to the predetermined intermediate layer, inputting data obtained by decoding the compression data, which is an output of the subsequent intermediate layer, to an output layer configured using a CNN (Convolutional Neural Network) model, and obtaining an analysis result of the observation data as an output of the output layer, and the learned neural network is learned in advance so as to minimize an error between an output of the output layer when observation data of which a true analysis result obtained by the analysis is known is input to the input layer and the true analysis result and an error between the observation data and the decoded data.

A learning apparatus according to the present invention is a learning apparatus that learns a neural network for analyzing observation data, including: a learning unit that learns the neural network, the neural network executing: a conversion process of converting the observation data to compression data obtained by compressing the observation data, the conversion process involves outputting the compression data which is an output of a predetermined intermediate layer obtained as a result of processing the observation data received via an input layer using portions ranging from the input layer to the intermediate layer; and an analysis process of obtaining an analysis result of the observation data from the compression data, the analysis process involves inputting the compression data to an intermediate layer subsequent to the predetermined intermediate layer, inputting data obtained by decoding the compression data, which is an output of the subsequent intermediate layer, to an output layer configured using a CNN (Convolutional Neural Network) model, and obtaining an analysis result of the observation data as an output of the output layer, wherein the neural network is learned so as to minimize an error between an output of the output layer when observation data of which a true analysis result obtained by the analysis is known is input to the input layer and the true analysis result and an error between the observation data and the decoded data.

A data analysis method according to the present invention is a data analysis method executed by a data analysis system including a device that analyzes observation data observed by an instrument, including: allowing the instrument to perform a conversion process of converting the observation data to compression data obtained by compressing the observation data, the conversion process involves outputting the compression data which is an output of a predetermined intermediate layer obtained as a result of processing the observation data received via an input layer of a learned neural network prepared in advance using portions ranging from the input layer to the intermediate layer; and allowing the device to perform an analysis process of obtaining an analysis result of the observation data from the compression data, the analysis process involves inputting the compression data to an intermediate layer subsequent to the predetermined intermediate layer, inputting data obtained by decoding the compression data, which is an output of the subsequent intermediate layer, to an output layer configured using a CNN (Convolutional Neural Network) model, and obtaining an analysis result of the observation data as an output of the output layer, wherein the learned neural network is learned in advance so as to minimize an error between an output of the output layer when observation data of which a true analysis result obtained by the analysis is known is input to the input layer and the true analysis result and an error between the observation data and the decoded data.

A learning method according to the present invention is a learning method executed by a learning apparatus that learns a neural network for analyzing observation data, including: allowing a learning unit to learn the neural network, the neural network executing: a conversion process of converting the observation data to compression data obtained by compressing the observation data, the conversion process involves outputting the compression data which is an output of a predetermined intermediate layer obtained as a result of processing the observation data received via an input layer using portions ranging from the input layer to the intermediate layer; and an analysis process of obtaining an analysis result of the observation data from the compression data, the analysis process involves inputting the compression data to an intermediate layer subsequent to the predetermined intermediate layer, inputting data obtained by decoding the compression data, which is an output of the subsequent intermediate layer, to an output layer configured using a CNN (Convolutional Neural Network) model, and obtaining an analysis result of the observation data as an output of the output layer, wherein the neural network is learned so as to minimize an error between an output of the output layer when observation data of which a true analysis result obtained by the analysis is known is input to the input layer and the true analysis result and an error between the observation data and the decoded data.

A program according to the present invention causes a computer to function as the conversion unit and the analysis unit included in the data analysis system.

A program according to the present invention causes a computer to function as the learning apparatus.

Effects of the Invention

As described above, according to the data analysis system, the method, and the program of the present invention, it is possible to perform analysis appropriately using a CNN model while reducing communication traffic.

DESCRIPTION OF EMBODIMENTS

Hereinafter, an embodiment of the present invention will be described with reference to the drawings.

<Overview>

First, a CNN model which is a locally connected model will be described. A CNN model is a model that imitates vision and uses local connections to reduce unnecessary connections, and high accuracy is obtained with many tasks. The input of the CNN model needs to maintain correlation with the neighborhood. Here, the neighborhood is adjacent pixels in image data and is values that are successive in time in time series data.

Figure 1:
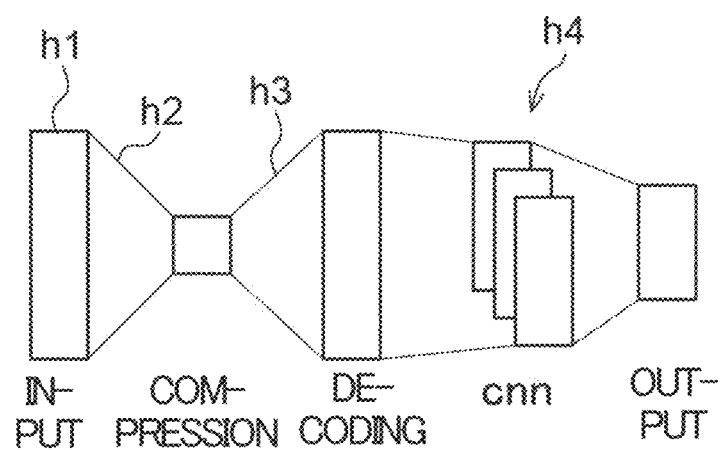
FIG. 1 is a diagram provided for description of a neural network according to the present embodiment.

In the present embodiment, as illustrated in FIG. 1, after information is narrowed down to information necessary for inference and compressed by a predetermined intermediate layer h2, the information is applied to a CNN model in an output layer h4. In this way, information is narrowed down to information necessary for inference while maintaining correlation with the neighborhood according to the following method in order to realize high-accuracy inference at higher compression rates.

Figure 2:
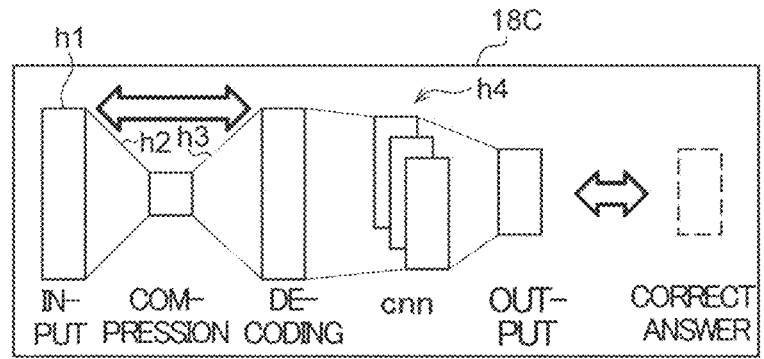
FIG. 2 is a diagram provided for description of a learning neural network according to the present embodiment.

First, learning is performed so that data compressed in a neural network is "information which is close to an original input and maintains correlation with neighborhood but from which portions necessary for inference are removed". Specifically, as illustrated in FIG. 2, a learning neural network 18C performs learning so as to minimize the sum of an error between an output of the output layer h4 and a correct answer and an error between an input of the input layer h1 and an output of the intermediate layer h3 and decoded data, which is an output of the intermediate layer h3. In this case, it is preferable that the weight of the former (the error between the output and the correct answer) is increased whenever the learning progresses.

General learning is performed so as to minimize the error between the output and the correct answer. Alternatively, learning is performed so as to minimize an error between the input and the decoded data. In the conventional technique, learning is performed so as to minimize either the error between the output and the correct answer or the error between the input and the decoded data. However, in the embodiment of the present invention, balance is taken so as to minimize the sum of both errors.

<Configuration of Data Analysis System>

In the embodiment of the present invention, an estimating-side data analysis system which includes an instrument such as a sensor and a device such as a server computer and performs data analysis using a learned neural network will be described.

Figure 3:
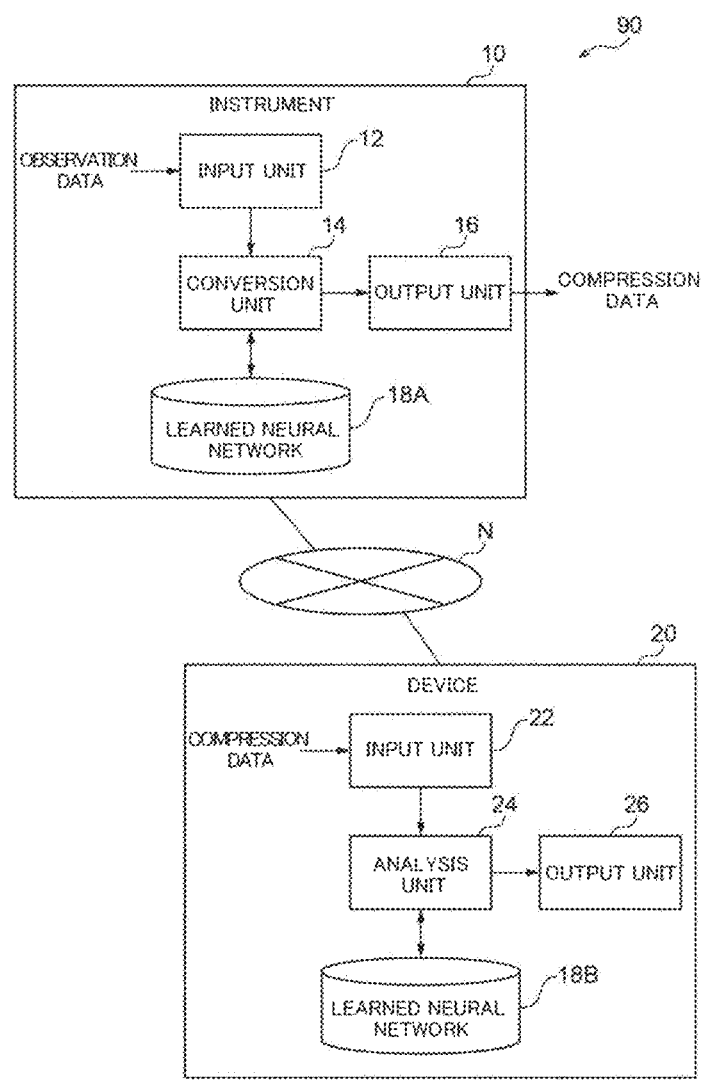
FIG. 3 is a diagram provided for description of a learned neural network according to the present embodiment.

FIG. 3 is a block diagram illustrating an example of a functional configuration of a data analysis system 90 according to the present embodiment.

As illustrated in FIG. 3, the data analysis system 90 according to the present embodiment includes an instrument 10 and a device 20. The instrument 10 and the device 20 are communicably connected by a network N.

The instrument 10 according to the present embodiment is a sensor, for example, and is attached to an observation target to acquire observation data from the observation target. The instrument 10 includes, as its electric components, a CPU (Central Processing Unit), a RAM (Random Access Memory), and a ROM (Read Only Memory). A data conversion processing program according to the present embodiment is stored in the ROM.

The data conversion processing program may be installed in advance in the instrument 10, for example. The data conversion processing program may be realized by being stored in a nonvolatile storage medium or being distributed via a network and being installed appropriately in the instrument 10. Examples of the nonvolatile storage medium include a CD-ROM (Compact Disc Read Only Memory), a magneto-optical disk, a DVD-ROM (Digital Versatile Disc Read Only Memory), a flash memory, and a memory card.

Figure 4:
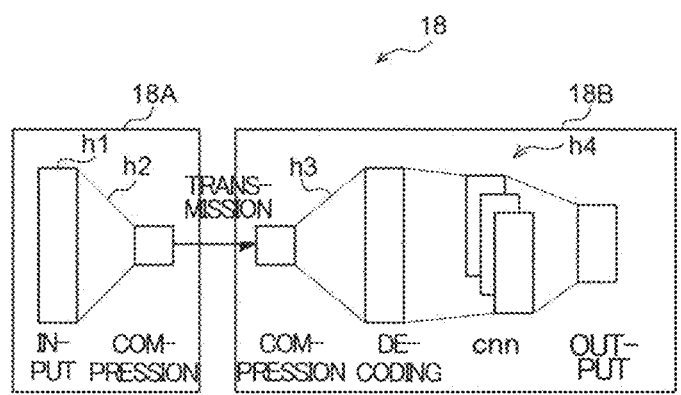
FIG. 4 is a block diagram illustrating an example of a functional configuration of a data analysis system according to the present embodiment.

The CPU functions as an input unit 12, a conversion unit 14, and an output unit 16 by reading and executing the data conversion processing program stored in the ROM. A learned neural network (a learned model) 18A illustrated in FIG. 4 is stored in the ROM. One learned neural network (hereinafter referred to as a learned neural network 18) is constructed by the learned neural network 18A included in the instrument 10 and a learned neural network 18B included in the device 20 to be described later. That is, one learned neural network 18 is separated by a predetermined intermediate layer h2, layers ranging from the input layer h1 to the predetermined intermediate layer h2 are included in the learned neural network 18A, and layers ranging from an intermediate layer h3 subsequent to the predetermined intermediate layer h2 to the output layer h4 are included in the learned neural network 18B.

The input unit 12 according to the present embodiment receives an input of observation data obtained from the observation target.

The conversion unit 14 according to the present embodiment performs a conversion process of converting the input from the input unit 12 to compression data obtained by compressing the received observation data. In this conversion process, the observation data is input to the input layer h1 of the learned neural network 18A and is converted to compression data using portions ranging from the input layer h1 to the predetermined intermediate layer h2. That is, the compression data is obtained as the output of the predetermined intermediate layer h2 of the learned neural network 18A.

The output unit 16 according to the present embodiment transmits the compression data obtained by the conversion unit 14 to the device 20 via the network N as the output of the instrument 10.

On the other hand, the device 20 according to the present embodiment is a server computer, for example, and includes, as its electric components, a CPU, a RAM, and a ROM. A data analysis processing program according to the present embodiment is stored in the ROM. The data analysis processing program may be installed in advance in the device 20, for example. The data analysis processing program may be realized by being stored in a nonvolatile storage medium or being distributed via a network and being installed appropriately in the device 20.

The CPU functions as an input unit 22, an analysis unit 24, and an output unit 26 by reading and executing the data analysis processing program stored in the ROM. The learned neural network (a learned model) 18B is stored in the ROM.

The input unit 22 according to the present embodiment receives an input of the compression data output from the instrument 10.

The analysis unit 24 according to the present embodiment performs an analysis process of obtaining an analysis result of the observation data from the compression data received from the input unit 22. In the analysis process, the compression data is input to the intermediate layer h3 subsequent to the predetermined intermediate layer, data obtained by decoding the compression data, which is the output of the subsequent intermediate layer h3, is input to the CNN model as the output layer h4, and the analysis result of the observation data is obtained as the output of the output layer h4.

The output unit 26 according to the present embodiment outputs an analysis result obtained by the analysis unit 24. This analysis result is output to a display unit (not illustrated) or a terminal apparatus designated in advance, for example.

By using the learned neural network 18B according to the present embodiment, the probabilities of the respective values classified from the compression data are output are output as the analysis result of the observation data. For example, when the image of observation data is a handwritten one-digit number and is classified in any one of the values of 0 to 9, the probabilities of the respective values of 0 to 9 are output.

The learned neural networks 18A and 18B are learned in advance by a learning apparatus to be described later. In a learning neural network, observation data which is different from analysis target observation data and of which the result of analysis (analysis result) is known is learned in advance as learning data. That is, a correct answer label indicating a value classified from an image indicated by learning data is assigned in advance to the learning data.

Figure 5:
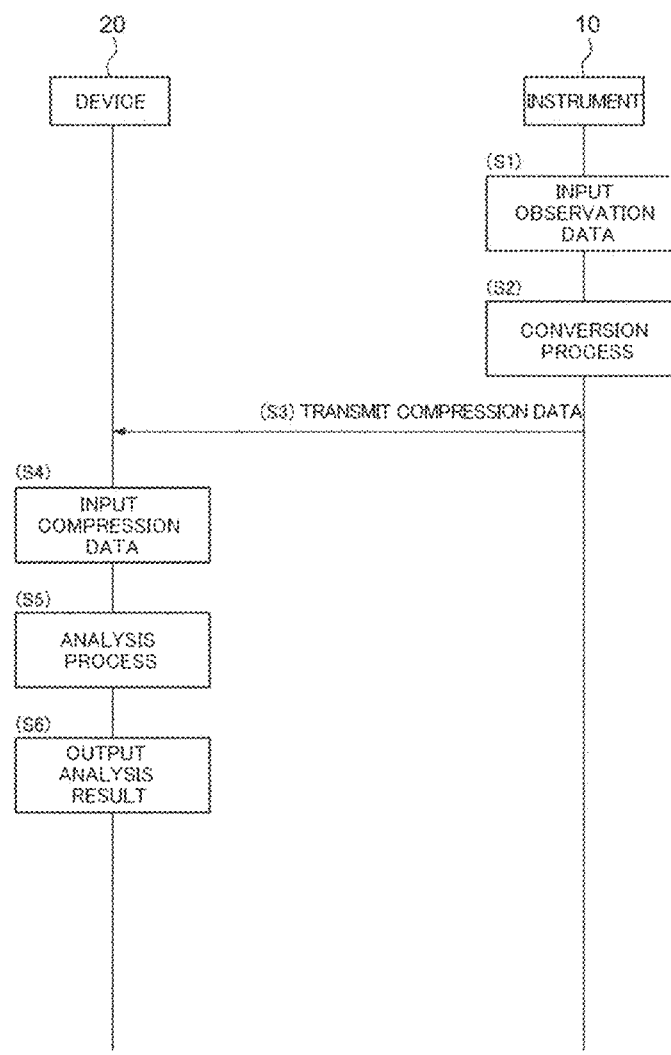
FIG. 5 is a sequence diagram illustrating an example of the flow of processing of a data conversion processing program and a data analysis processing program according to the present embodiment.

Next, an operation of the data analysis system 90 according to the present embodiment will be described with reference to FIG. 5. FIG. 5 is a sequence diagram illustrating an example of the flow of the processing of the data conversion processing program and the data analysis processing program according to the present embodiment.

In step S1 of FIG. 5, the input unit 12 of the instrument 10 receives an estimation target image as observation data as an example.

In step S2, the conversion unit 14 of the instrument 10 converts the observation data input in step S1 to compression data obtained by compressing the observation data using the learned neural network 18A.

In step S3, the output unit 16 of the instrument 10 transmits the output of the predetermined intermediate layer h2 as the compression data obtained by the conversion in step S2 to the device 20.

Subsequently, in step S4, the input unit 22 of the device 20 receives the output of the predetermined intermediate layer h2 as the compression data, transmitted from the instrument 10 in step S3.

In step S5, the analysis unit 24 of the device 20 analyzes the output value of the predetermined intermediate layer h2 as the compression data input in step S4 using the learned neural network 18B. In this case, the compression data is input to the intermediate layer h3 subsequent to the predetermined intermediate layer, the data obtained by decoding the compression data, which is the output of the subsequent intermediate layer h3, is input to a CNN model as the output layer h4, and the analysis result of the observation data is obtained as the output of the output layer h4.

In step S6, the output unit 26 of the device 20 outputs the analysis result of step S5 and a series of steps of processing by the data conversion processing program and the data analysis processing program ends.

Next, a learning apparatus for learning the learned neural networks 18A and 18B used in the data analysis system 90 will be described.

Figure 6:
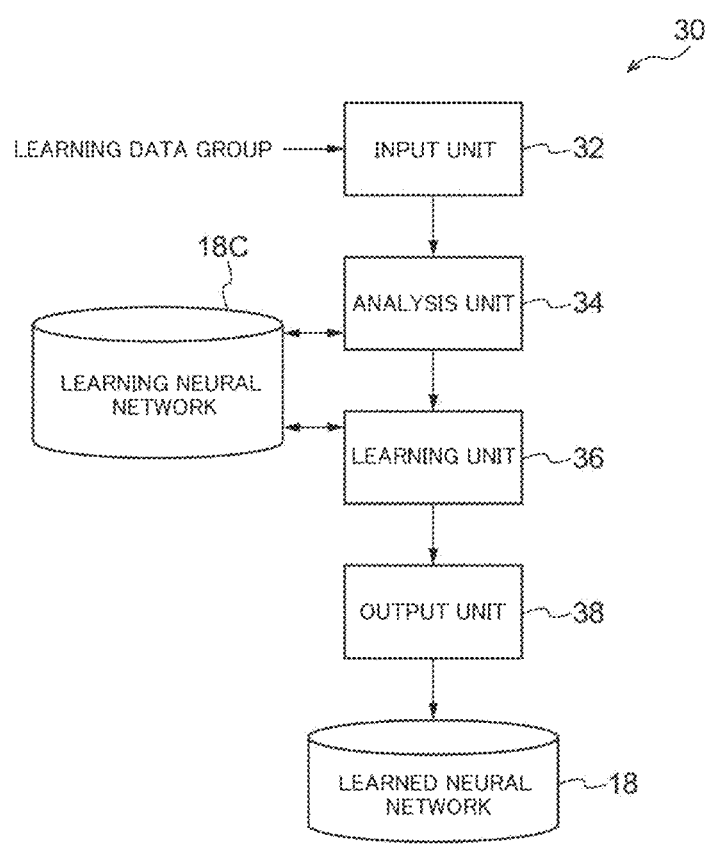
FIG. 6 is a block diagram illustrating an example of a functional configuration of a learning apparatus according to the present embodiment.

FIG. 6 is a block diagram illustrating an example of a functional configuration of a learning apparatus 30 according to the present embodiment.

A personal computer or a server computer, for example, is used as the learning apparatus 30 according to the present embodiment. The learning apparatus 30 may be realized as one function of the device 20 illustrated in FIG. 3. The learning apparatus 30 includes, as its electric components, a CPU, a RAM, and a ROM. A learning processing program according to the present embodiment is stored in the ROM. The learning processing program may be installed in advance in the learning apparatus 30, for example. The learning processing program may be realized by being stored in a nonvolatile storage medium or being distributed via a network and being installed appropriately in the learning apparatus 30.

The CPU functions as an input unit 32, an analysis unit 34, a learning unit 36, and an output unit 38 by reading and executing the learning processing program stored in the ROM.

The input unit 32 according to the present embodiment receives an input of a group of learning data including a plurality of pieces of learning data. The learning data mentioned herein is observation data of which the analysis result is known unlike the analysis target observation data.

The analysis unit 34 according to the present embodiment performs a process of obtaining the analysis result of the learning data received from the input unit 32 using a learning neural network 18C. In the learning neural network 18C, a conversion process of converting the learning data to compression data using portions ranging from the input layer h1 to the predetermined intermediate layer h2. That is, the compression data is obtained as an output of the predetermined intermediate layer h2 of the learning neural network 18C.

In the learning neural network 18C, an analysis process of restoring the observation data from the compression data obtained in the predetermined intermediate layer h2 and obtaining the analysis result of the learning data using portions ranging from the intermediate layer h3 subsequent to the predetermined intermediate layer h2 to the output layer h4. In this analysis process, the compression data is input to the intermediate layer h3 subsequent to the predetermined intermediate layer h2, data obtained by decoding the compression data, which is the output of the subsequent intermediate layer h3, is input to the output layer h4 including a CNN model, and the analysis result of the learning data is obtained as the output of the output layer h4.

The learning unit 36 according to the present embodiment performs an updating process of updating the weight in the learning neural network 18C so as to minimize an error between the output of the output layer h4 and a true analysis result when learning data is input to the input layer h1 and an error between the learning data and the decoded data using the analysis result obtained by the analysis unit 34 analyzing the learning data and the correct answer label assigned to the learning data.

Specifically, an updating process of updating the weight in the learning neural network 18C is performed so as to minimize an objective function which is a weighted sum of an error between the analysis result obtained by the analysis unit 34 analyzing the learning data and the correct answer label assigned to the learning data and an error between the learning data and the data restored by the subsequent intermediate layer h3 from the compression data obtained in the predetermined intermediate layer h2.

The output unit 38 according to the present embodiment outputs the learned neural network 18 constructed from the learning neural network 18C obtained by the learning in a storage unit or the like.

Figure 7:
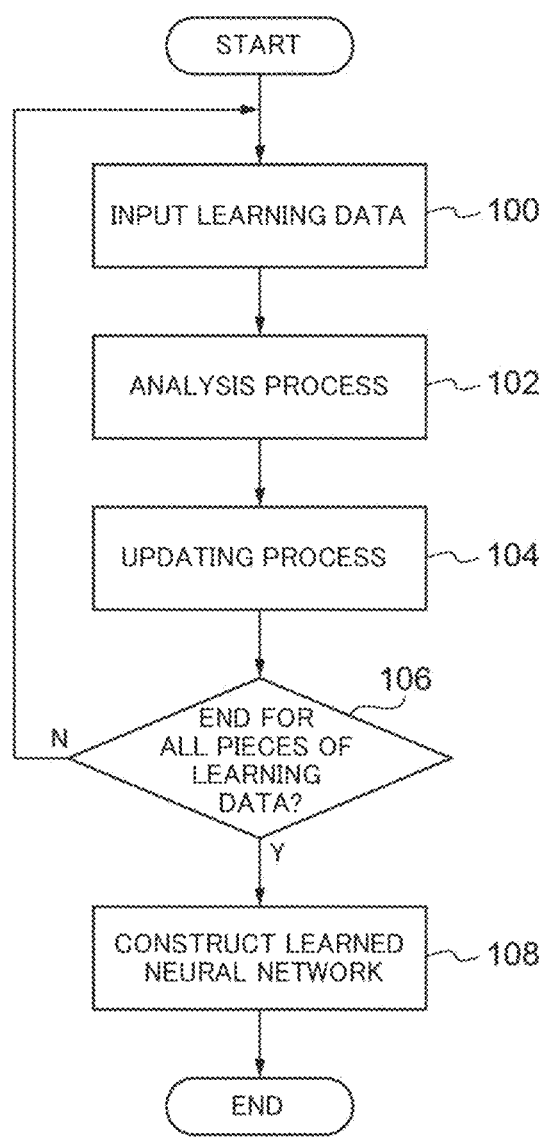
FIG. 7 is a flowchart illustrating an example of the flow of processing of a learning processing program according to the present embodiment.

Next, an operation of the learning apparatus 30 according to the present embodiment will be described with reference to FIG. 7. FIG. 7 is a flowchart illustrating an example of the flow of the processing of the learning processing program according to the present embodiment.

In step 100 of FIG. 7, the input unit 32 inputs learning data to the input layer h1 of the learning neural network 18C. For example, a hand-written one-digit number image of which the written number is known is input as the learning data.

In step 102, the analysis unit 34 converts the learning data input to the input layer h1 in step 100 to compression data obtained by compressing the learning data using the predetermined intermediate layer h2.

In step 102, the analysis unit 34 performs an analysis process of obtaining the analysis result of the learning data from the obtained compression data. In this analysis process, the compression data is input from the predetermined intermediate layer h2 to the subsequent intermediate layer h3, and the data obtained by decoding the compression data, which is the output of the subsequent intermediate layer h3, is input to the output layer h4, and the analysis result of the learning data is used as the output of the output layer h4. For example, the probabilities corresponding to the respective numbers of 0 to 9 are output from the output layer h4 of the learning neural network 18C as the analysis result.

In step 104, the learning unit 36 performs an updating process of updating the weight in the learning neural network 18C using the analysis result obtained by analyzing the learning data in step 102 and the correct answer label assigned to the learning data. This updating process is performed by minimizing the objective function which is the weighted sum of an error between the analysis result obtained by the analysis unit 34 analyzing the learning data and the correct answer label assigned to the learning data on the basis of the learning data transmitted from the input layer h1 and an error between the learning data and the data restored by the subsequent intermediate layer h3 from the compression data obtained in the predetermined intermediate layer h2.

In step 106, the output unit 38 determines whether all pieces of learning data have been processed. When it is determined that all pieces of learning data have been processed (case of an affirmative determination result), the flow proceeds to step 108. When it is determined that all pieces of learning data have not been processed (case of a negative determination result), the flow returns to step 100 and the processing is repeated.

In step 108, the output unit 38 constructs the learned neural network 18 on the basis of the learning neural network 18C and outputs the constructed learned neural network 18 in a storage unit or the like, and a series of steps of processing by the learning processing program ends.

As described above, according to the analysis system according to the present embodiment, the instrument performs a conversion process of outputting the compression data which is the output of an intermediate layer obtained as a result of processing the observation data received via the input layer of the learned neural network using portions ranging from the input layer and the predetermined intermediate layer. The device performs an analysis process of inputting the compression data to the intermediate layer subsequent to the predetermined intermediate layer, inputting the data obtained by decoding the compression data, which is the output of the subsequent intermediate layer, to the output layer configured using a CNN model, and obtaining the analysis result of the observation data as the output of the output layer. In this way, it is possible to perform analysis appropriately using the CNN model while reducing communication traffic.

Modified Example

Figure 8:
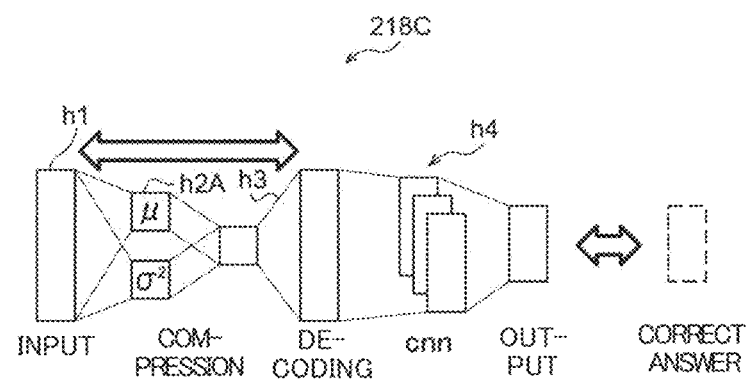
FIG. 8 is a diagram provided for description of a learning neural network according to a modified example.

As illustrated in FIG. 8, in a learning neural network 218C, a predetermined intermediate layer h2A may include nodes that output the mean and the variance of compression data, and data which is an addition of the output of the mean output node and the output of the variance output node may be input to an intermediate layer h3 subsequent to the predetermined intermediate layer h2A as the compression data.

Figure 9:
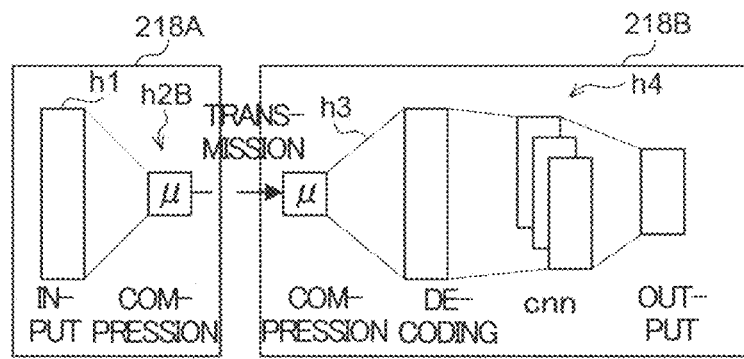
FIG. 9 is a diagram provided for description of a learned neural network according to a modified example.
Figure 10:
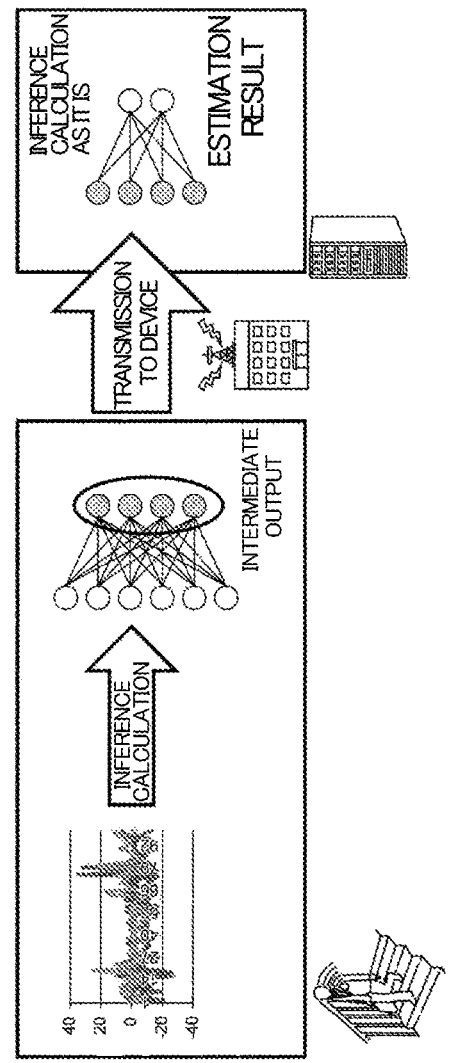
FIG. 10 is a diagram provided for description of a conventional technique.

In this case, as illustrated in FIG. 9, in a learned neural network 218A of an instrument, a predetermined intermediate layer h2B includes a node that output the mean of compression data, and the output of the mean output node is output as compression data as it is, and the compression data is input to an intermediate layer h3 subsequent to the predetermined intermediate layer h2B.

More specifically, the learned neural networks 218A and 218B are learned in advance by a learning apparatus. In the learning neural network 218C for learning the learned neural networks 218A and 218B with the aid of the learning apparatus, the predetermined intermediate layer h2A includes nodes that output the mean and the variance of compression data. The neural network 218C is configured so that the output of the variance output node is added to the mean output node, and the addition result is input to the intermediate layer h3 subsequent to the predetermined intermediate layer h2A as the compression data.

The learning unit 36 according to the present embodiment performs an updating process of updating the weight in the learning neural network 218C using the analysis result obtained by the analysis unit 34 analyzing the learning data and the correct answer label assigned to the learning data.

More specifically, an updating process of updating the weight in the learning neural network 218C so as to minimize an objective function which is a weighted sum of an error between the analysis result obtained by the analysis unit 34 analyzing the learning data and the correct answer label assigned to the learning data and an error between the learning data and the data restored by the subsequent intermediate layer h3 from the compression data obtained in the predetermined intermediate layer h2A.

The conversion unit 14 according to the present embodiment outputs the compression data using the output of the node that outputs the mean y of the predetermined intermediate layer h2B in the learned neural network 218A as the output of the predetermined intermediate layer h2B.

A case in which a data analysis system includes an instrument and a device which are physically separated has been described as the embodiment. In the embodiment, the instrument and the device may be configured as one apparatus.

A data analysis system and a learning apparatus have been described as the embodiment. The embodiment may be a program for causing a computer to function as each unit of the data analysis system and the learning apparatus. The embodiment may be a computer-readable storage medium having the program stored therein.

The configuration of the data analysis system and the learning apparatus described in the embodiment is an example only and may be changed depending on a situation without departing from the spirit thereof.

The flow of the processing of the programs described in the embodiment is an example only, and unnecessary steps may be omitted, new steps may be added, and the processing order may be changed without departing from the spirit thereof.

Although a case in which processing according to the embodiment is realized by a software configuration using a computer by executing a program has been described in the embodiment, there is no limitation thereto. The embodiment may be realized by a hardware configuration or a combination of the hardware configuration and the software configuration, for example.

REFERENCE SIGNS LIST

10 Instrument
12 Input unit
14 Conversion unit
16 Output unit
18, 18A, 18B, 218A, 218B Learned neural network
18C, 218C Learning neural network
20 Device
22 Input unit
24 Analysis unit
26 Output unit
30 Learning apparatus
32 Input unit
34 Analysis unit
36 Learning unit
38 Output unit
90 Data analysis system

The invention claimed is:

1. A data analysis system including a device that analyzes observation data observed by an instrument,
wherein the instrument includes a convertor configured to perform a conversion process of converting the observation data to compression data obtained by compressing the observation data, the conversion process involves outputting the compression data which is an output of a predetermined intermediate layer obtained as a result of processing the observation data received via an input layer of a learned neural network prepared in advance using portions ranging from the input layer to the intermediate layer, the device includes an analyzer configured to perform an analysis process of obtaining an analysis result of the observation data from the compression data, the analysis process includes:

inputting the compression data to an intermediate layer subsequent to the predetermined intermediate layer, inputting data obtained by decoding the compression data, which is an output of the subsequent intermediate layer, to an output layer configured using a Convolutional Neural Network (CNN) model, and obtaining an analysis result of the observation data as an output of the output layer, and the learned neural network is learned in advance so as to minimize an error between an output of the output layer when observation data of which a true analysis result obtained by the analysis is known is input to the input layer and the true analysis result and an error between the observation data and the decoded data.

2. The data analysis system according to claim 1, wherein, in learning of the learned neural network, the predetermined intermediate layer includes nodes that output a mean and a variance of the compression data, an output of the node that outputs the variance is added to an output of the node that outputs the mean, and an addition result is input to the intermediate layer subsequent to the predetermined intermediate layer, and the conversion unit outputs the output of the node that outputs the mean as the compression data.

3. The data analysis system according to claim 2, wherein the observation data includes an image data of handwriting.

4. The data analysis system according to claim 1, wherein the observation data includes an image data of handwriting.

5. A learning apparatus that learns a neural network for analyzing observation data, comprising:

a learner configured to learn the neural network, the neural network executing:

a convertor configured to convert the observation data to compression data obtained by compressing the observation data, the conversion process involves outputting the compression data which is an output of a predetermined intermediate layer obtained as a result of processing the observation data received via an input layer using portions ranging from the input layer to the intermediate layer; and an analyzer configured to obtain an analysis result of the observation data from the compression data, the analysis process includes inputting the compression data to an intermediate layer subsequent to the predetermined intermediate layer, inputting data obtained by decoding the compression data, which is an output of the subsequent intermediate layer, to an output layer configured using a Convolutional Neural Network (CNN) model, and obtaining an analysis result of the observation data as an output of the output layer, wherein the neural network is learned so as to minimize an error between an output of the output layer when observation data of which a true analysis result obtained by the analysis is known is input to the input layer and the true analysis result and an error between the observation data and the decoded data.

6. The learning apparatus according to claim 5, wherein in the neural network, the predetermined intermediate layer includes nodes that output a mean and a variance of the compression data, and the learner adds an output of the node that outputs the variance to an output of the node that outputs the mean, and inputs an addition result to the intermediate layer subsequent to the predetermined intermediate layer.

7. The learning apparatus according to claim 6, wherein the observation data includes an image data of handwriting.

8. The learning apparatus according to claim 5, wherein the observation data includes an image data of handwriting.

9. A method executed by a data analysis system including a device that analyzes observation data observed by an instrument, comprising:

allowing the instrument to perform a conversion process of converting the observation data to compression data obtained by compressing the observation data, the conversion process involves outputting the compression data which is an output of a predetermined intermediate layer obtained as a result of processing the observation data received via an input layer of a learned neural network prepared in advance using portions ranging from the input layer to the intermediate layer; and allowing the device to perform an analysis process of obtaining an analysis result of the observation data from the compression data, the analysis process involves inputting the compression data to an intermediate layer subsequent to the predetermined intermediate layer, inputting data obtained by decoding the compression data, which is an output of the subsequent intermediate layer, to an output layer configured using a Convolutional Neural Network (CNN) model, and obtaining an analysis result of the observation data as an output of the output layer, wherein the learned neural network is learned in advance so as to minimize an error between an output of the output layer when observation data of which a true analysis result obtained by the analysis is known is input to the input layer and the true analysis result and an error between the observation data and the decoded data.

10. The method of claim 9, the method further comprising:

learning, by the learner, the neural network, the neural network executing:

a conversion process of converting the observation data to compression data obtained by compressing the observation data, the conversion process involves outputting the compression data which is an output of a predetermined intermediate layer obtained as a result of processing the observation data received via an input layer using portions ranging from the input layer to the intermediate layer; and obtaining, by an analyzer, an analysis result of the observation data from the compression data.

11. The method of claim 10, herein the observation data includes an image data of handwriting.

12. The method of claim 10, wherein in the neural network, the predetermined intermediate layer includes nodes that output a mean and a variance of the compression data, and the learner adds an output of the node that outputs the variance to an output of the node that outputs the mean, and inputs an addition result to the intermediate layer subsequent to the predetermined intermediate layer.

13. The method of claim 9, herein the observation data includes an image data of handwriting.

14. The method of claim 9, wherein, in learning of the learned neural network, the predetermined intermediate layer includes nodes that output a mean and a variance of the compression data, an output of the node that outputs the variance is added to an output of the node that outputs the mean, and an addition result is input to the intermediate layer subsequent to the predetermined intermediate layer, and the conversion unit outputs the output of the node that outputs the mean as the compression data.

\* \* \* \* \*